(12) United States Patent
Miyazawa et al.

(10) Patent No.: US 7,389,035 B2
(45) Date of Patent: Jun. 17, 2008

(54) STREAM PROCESSING SYSTEM WITH FUNCTION FOR SELECTIVELY PLAYBACKING ARBITRARY PART OF REAM STREAM

(75) Inventors: Takayuki Miyazawa, Kanagawa (JP); Masaru Suzuki, Kanagawa (JP); Yoichi Takebayashi, Kanagawa (JP); Yasuko Nakayama, Kanagawa (JP); Yuzo Tamada, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1034 days.

(21) Appl. No.: 10/373,705

(22) Filed: Feb. 27, 2003

(65) Prior Publication Data

US 2003/0161610 A1  Aug. 28, 2003

(30) Foreign Application Priority Data

Feb. 28, 2002 (JP) .............................. 2002-053701

(51) Int. Cl.
*H04N 5/91* (2006.01)
(52) U.S. Cl. ............................ 386/46; 386/52; 386/57; 386/67; 386/69
(58) Field of Classification Search .................. 386/46, 386/52, 57, 67, 69
See application file for complete search history.

(56) References Cited

U.S. PATENT DOCUMENTS 5,787,414 A  7/1998  Miike et al.
5,818,510 A * 10/1998  Cobbley et al. ............ 725/139
5,918,222 A  6/1999  Fukui et al.
6,289,165 B1  9/2001  Abecassis

FOREIGN PATENT DOCUMENTS

| EP | 0 555 028 A2 | 8/1993 | |
|---|---|---|---|
| EP | 0555028 | * 8/1993 | .................. 386/95 |
| EP | 0 929 197 A2 | 7/1999 | |
| JP | 05-282379 | 10/1993 | |
| JP | 11-205704 | 7/1999 | |
| WO | WO 00/45388 | 8/2000 | |
| WO | WO 01/77776 A2 | 10/2001 | |
| WO | WO 02/11446 A2 | 2/2002 | |

OTHER PUBLICATIONS

U.S. Appl. No. 10/373,705, filed Feb. 27, 2003, Miyazawa et al.

* cited by examiner

*Primary Examiner*—Marsha D. Banks-Harold
*Assistant Examiner*—Daniel Tekle
(74) *Attorney, Agent, or Firm*—Oblon, Spivak, McClelland, Maier & Neustadt, P.C.

(57) ABSTRACT

In a stream processing system, a stream partitioned by a prescribed time interval is extracted as a partial stream, from one or more real streams formed by continuous time series data, according to playback position information or timestamps of the real streams, and a virtual stream is produced by concatenating one or more partial streams so as to enable a continuous playback. Then, a stream partitioned by another prescribed time interval is extracted as a partial virtual stream, from the virtual stream, according to playback position information or timestamps of the virtual stream, and a meta information related to a content of the partial virtual stream is stored in relation to the partial virtual stream.

10 Claims, 25 Drawing Sheets

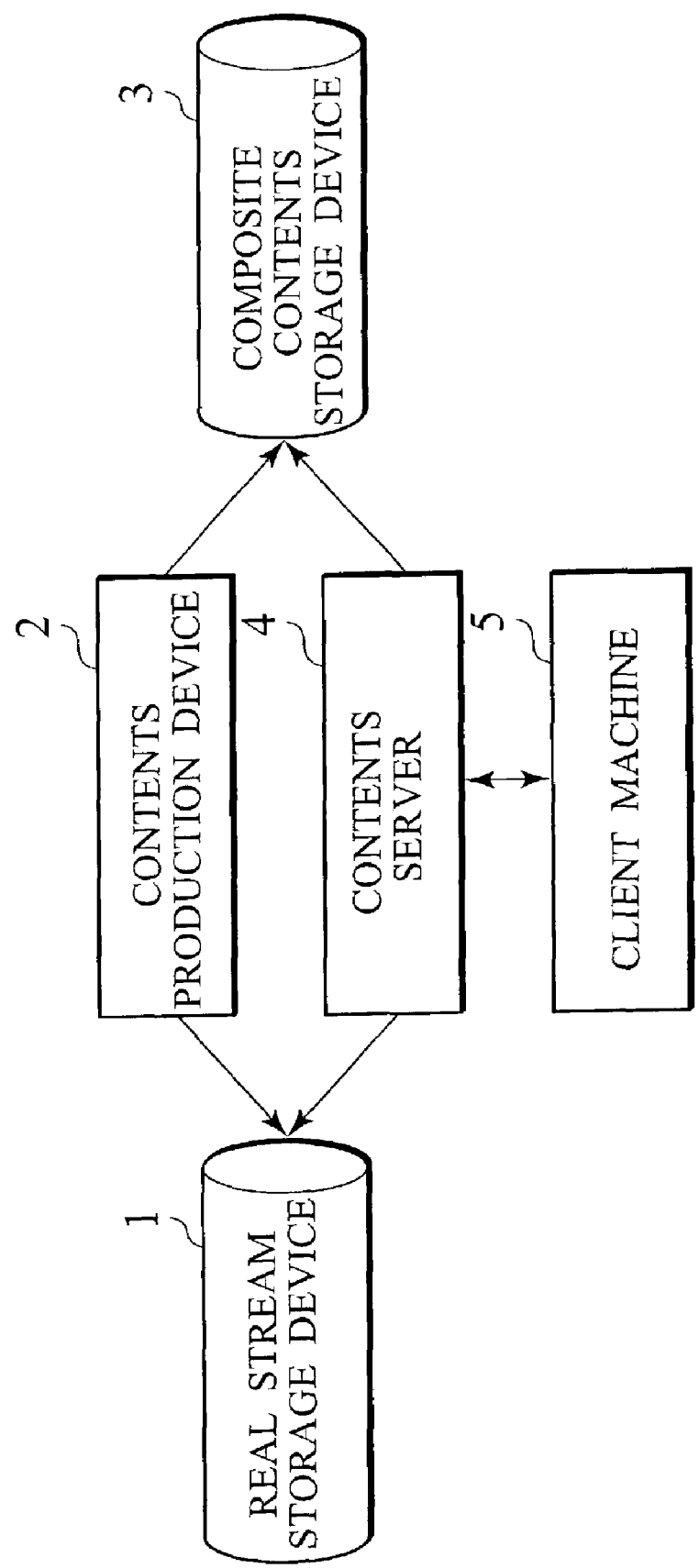

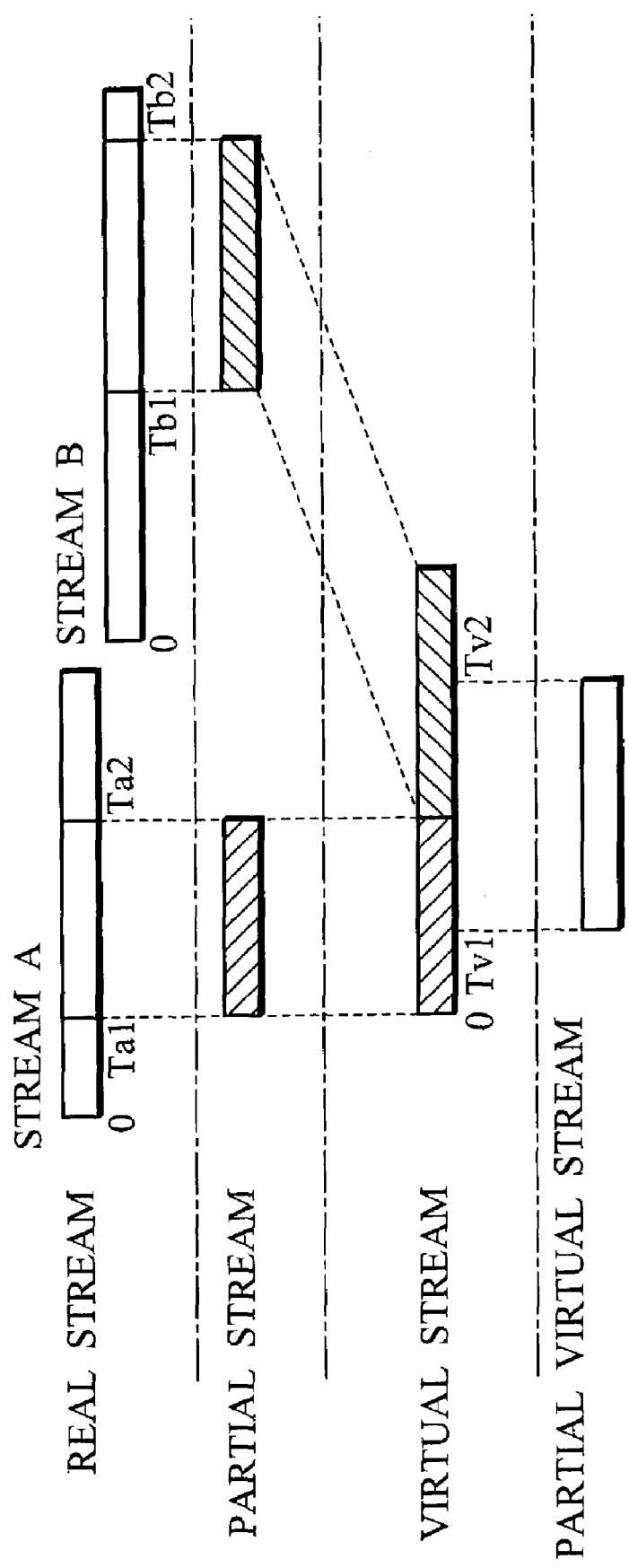

FIG. 3

VIRTUAL STREAM INFORMATION TABLE

| VIRTUAL STREAM IDENTIFIER : VIRTUAL STREAM V1 | | |
|---|---|---|
| STREAM IDENTIFIER | START TIME | END TIME |
| STREAM A | Ta1 | Ta2 |
| STREAM B | Tb1 | Tb2 |

FIG. 4

META INFORMATION TABLE

| TITLE | ECOLOGY OF WHALES |
|---|---|
| TEXT | WHALES ARE A MAMMAL LIVING IN THE OCEAN... |
| KEYWORD | WHALE, ECOLOGY, MAMMAL,... |
| LINK INFO. | animals/sea. avi |

FIG. 5

TABLE OF META INFORMATION ATTACHED
TO PARTIAL VIRTUAL STREAM

| START TIME | END TIME | META INFORMATION |
|---|---|---|
| 00 : 00 : 05 | 00 : 00 : 30 | TITLE = ECOLOGY OF WHALES, TEXT = ... |
| 00 : 00 : 20 | 00 : 30 : 30 | TITLE = FOODS OF WHALES, TEXT = ... |
| 00 : 00 : 30 | 00 : 00 : 55 | TITLE = HABITATS OF WHALES, TEXT =... |
| ... | | |

FIG. 6

EXEMPLARY DESCRIPTION OF COMPOSITE CONTENTS

```xml
<?xml version="1.0" encoding="Shift_JIS"?>
<!-- ############################################ -->
<!-- ## Virtual Stream Description           ## -->
<!-- ##            for MKIDS-Author.         ## -->
<!-- ############################################ -->
<Mpeg7 type="complete" xmlns=http://www.mpeg7.org/2001/MPEG-7_Schema
xmlns:xsi="http://www.w3.org/2000/10/XMLSchema-instance"
xsi:schemaLocation="http://www.mpeg7.org/2001/MPEG-7_Schema">

<!-- ****************************************** -->
        <!-- ** Description Metadata                 ** -->
        <!-- **    to Describe Data-type for MKIDS   ** -->
        <!-- ****************************************** -->
        <DescriptionMetadata>
                <PrivateIdentifier>Virtual Stream for MKIDS(Leather No.2)</PrivateIdentifier>

<!-- Copyright -->
                <Comment>
                        <FreeTextAnnotation xml:lang="jp">
                                Copyright (C) 2001 TOSHIBA Corporation. All Rights Reserved.
                        </FreeTextAnnotation>
                </Comment>

<!-- Creator -->
                <Creator>
                        <Role href="urn:mpeg:MPEG7RoleCS:STAFF">
                                <Name xml:lang="en">Staff</Name>
                        </Role>
                        <Agent xsi:type="PersonType">
                                <Name xml:lang="jp">
                                        <GivenName>Unknown</GivenName>
                                        <FamilyName>Unknown</FamilyName>
                                </Name>
                        </Agent>
```

FIG. 7

```xml
</Creator>

<!-- Created Location -->
<CreationLocation>
        <Country>jp</Country>
        <AdministrativeUnit>Tokyo</AdministrativeUnit>
</CreationLocation>

<!-- Created Time -->
<CreationTime>2001-11-12T10:41:37+09:00</CreationTime>

<!-- Last Update Time -->
<LastUpdate>2001-11-16T13:31:54+09:00<LastUpdate>
</DiscriptionMetadata>

<!-- ******************************************* -->
<!-- **   Content Management Description    ** -->
<!-- ******************************************* -->
<ContentManagement xsi:type="CreationDescriptionType">
        <!-- *************************** -->
        <!-- **   Criation Description   ** -->
        <!-- *************************** -->
        <CreationInformation>
                <Creation>
                        <Abstract>
                                <FreeTextAnnotation xml:lang="jp">MAKING ANIMAL FIGURE BY LEATHER
</FreeTextAnnotation>
                        </Abstract>
                        <Title xml:lang="jp">ANIMAL, PROCEDURE</Title>
                </Creation>
        </CreationInformation>
</ContentManagement>

<ContentDescription xsi:type="SummaryDescriptionType>
        <!-- ******************************************* -->
        <!-- **       Summarization Description     ** -->
```

FIG. 8

```
<!-- ****************************************** -->
<Summarization>
        <Summary id="VStream01" xsi:type="SequentialSummaryType">
                <VisualSummaryComponent>
                        <VideoSourceLocator>

<MediaUri>http://www.rdc.toshiba.co.jp/MKIDS/Media/MAKING ANIMAL FIGURE BY
LEATHER.avi</MediaUri>
                        <VideoSourceLocator>
                        <ComponentSourceTime>
                                <MediaRelTimePoint
timebase="../../VideoSourceLocator">PT0S0N10F</MediaRelTimePoint>

<MediaDuration>PT37S5N10F</MediaDuration>
                                </ComponentSourceTime>
                        </VisualSummaryComponent>
                        <AudioSummaryComponent>
                                <AudioSourceLocator>

<MediaUri>http://www.rdc.toshiba.co.jp/MKIDS/Media/LEATHER HANDWORK-PROCEDURE,Q&
A-mpeg4.AVI</MediaUri>
                                </AudioSourceLocator>
                                <ComponentSourceTime>
                                        <MediaRelTimePoint
timebase="../../AudioSourceLocator">PT0S0N10F</MediaRelTimePoint>

<MediaDuration>PT37S6N10F</MediaDuration>
                                </ComponentSourceTime>
                        </AudioSummaryComponent>
                        <TextualSummaryComponent>
                                <FreeTextAnnotation xml:lang="jp">
                                <Title>LET'S MAKE ANIMAL FIGURE BY LEATHER.</Title>
                                <Body>
<Telop>
(MR. SO-AND-SO)

I SHOW YOU FLOWCHART IN "MORE DETAILED EXPLANATION".
```

FIG. 9

```
</Telop>
<Explanation>
  PROCEDURE "MAKING ANIMAL FIGURE BY LEATHER"

PRODUCING DEVELOPMENT OF ANIMAL FIGURE TO BE MADE (PATTERN)
    ↓
  COPYING PATTERN TO LEATHER
    ↓
  CUTTING LEATHER ACCORDING TO PATTERN
    ↓
  MOISTENING LEATHER
    ↓
  FORMING SHAPE (ROUNDING, BENDING)
    ↓
  DRYING
    ↓
  ADDING EXPRESSION
    ↓
  COMPLETION
</Explanation>
<Question startTime="14" endTime="20">
METHOD FOR COPYING PATTERN TO LEATHER
</Question>
<Question startTime="22" endTime="27">
METHOD FOR MOISTENING LEATHER
</Question>
<Question startTime="33" endTime="36">
METHOD FOR ADDING EXPRESSION
</Question>
</Body>
                              </FreeTextAnnotation>
                        </TextualSummaryComponent>
                    </Summary>
                </Summarization>
            </ContentDescription>
    </Mpeg7>
```

FLOWCHART FOR CONTENTS SERVER

FLOWCHART FOR CLIENT MACHINE

USER OPERATION PROCESSING OF CLIENT MACHINE

META INFORMATION PLAYBACK PROCESSING

SCHEMATIC CONFIGURATION OF SECOND EMBODIMENT
OF STREAM PROCESSING DEVICE

FIG. 20

EXEMPLARY COMPOSITE CONTENTS

| TIME SERIES DATA | a0013.mov | a0025.mov | | a0102.mov | a0089.mov | a0021.mov |
|---|---|---|---|---|---|---|
| START POINT | 00:13:06 | 00:00:12 | | 00:09:43 | 00:01:33 | 00:32:12 |
| END POINT | 00:15:24 | 00:03:19 | | 00:12:32 | 00:04:53 | 00:36:21 |
| TEXT INFORMATION | ECOLOGY OF WHALES | | | ECOLOGY OF PENGUINS | | |

52

51

SELECTION PROCESSING BY SELECTION UNIT

EXEMPLARY SEARCH REQUEST

EXEMPLARY PLAYBACK INFORMATION

| TIME SERIES DATA | a0102. mov |
|---|---|
| PLAYBACK POSITION | 00 : 10 : 22 |

ANOTHER EXEMPLARY SEARCH REQUEST

| SEARCH REQUEST | WHAT IS FOOD ?<br>ECOLOGY OF WHALES |
|---|---|

SCHEMATIC CONFIGURATION OF THIRD EMBODIMENT
OF STREAM PROCESSING DEVICE

FLOWCHART FOR META INFORMATION ATTACHING UNIT

FLOWCHART FOR META INFORMATION ATTACHING UNIT IN CASE OF DELETING 2ND CONTENTS

FIG. 30

EXEMPLARY CONTENTS

| TIME SERIES DATA | a0014.mov | a0013.mov | a0103.mov | a0028.mov | a0005.mov |
|---|---|---|---|---|---|
| START POINT | 00:12:16 | 00:12:16 | 00:10:42 | 00:03:36 | 00:08:06 |
| END POINT | 00:13:13 | 00:18:32 | 00:13:19 | 00:05:12 | 00:11:13 |
| TEXT INFORMATION | MAMMALS & FISHES LIVING IN OCEAN | | | | |

53

STREAM PROCESSING SYSTEM WITH FUNCTION FOR SELECTIVELY PLAYBACKING ARBITRARY PART OF REAM STREAM

BACKGROUND OF THE INVENTION

1. Field of the Invention

The present invention relates to a real stream processing system capable of realizing the stream playback for playbacking data while transferring data.

2. Description of the Related Art

It has become increasingly popular to use the stream playback for playbacking data in real time while transferring data from a server rather than downloading data transferred from a server first and then playbacking the downloaded data.

In the case of the stream playback, the playback can be started as soon as the transfer of data from the server starts, so that a user on the client machine side does not have to be kept waiting and there is no need to provide a large capacity storage device on the client machine side so that it is possible to simplify the hardware configuration of the client machine side. There is also a merit that it is possible to prevent the unauthorized secondary use of the downloaded data.

For these reasons, the wider spread of the stream playback is expected in conjunction with the advance of the broadband technology in future.

The stream data transferred from the server are just ordinary time series data, and the stream data themselves do not have any information for identifying data or information on data characteristics. For this reason, it has been difficult to realize a selection of a specific part of the stream data in an attempt to select and playback only a selected part of the stream data.

BRIEF SUMMARY OF THE INVENTION

It is therefore an object of the present invention to provide a stream processing system capable of selectively playbacking an arbitrary part of the real stream in a simple manner.

According to one aspect of the present invention there is provided a stream processing system, comprising: a partial stream extraction unit configured to extract a stream partitioned by a prescribed time interval as a partial stream, from one or more real streams formed by continuous time series data, according to playback position information or timestamps of the real streams; and a meta information storing unit configured to store a meta information related to a content of the partial stream, in relation to the partial stream.

According to another aspect of the present invention there is provided a stream processing system, comprising: a partial stream extraction unit configured to extract a stream partitioned by a prescribed time interval as a partial stream, from one or more real streams formed by continuous time series data, according to playback position information or timestamps of the real streams; a virtual stream production unit configured to produce a virtual stream by concatenating one or more partial streams extracted by the partial stream extraction unit so as to enable a continuous playback; a partial virtual stream extraction unit configured to extract a stream partitioned by another prescribed time interval as a partial virtual stream, from the virtual stream, according to playback position information or timestamps of the virtual stream; and a meta information storing unit configured to store a meta information related to a content of the partial virtual stream, in relation to the partial virtual stream.

According to another aspect of the present invention there is provided a computer program product for causing a computer to function as a stream processing system, the computer program product comprising: a first computer program code for causing the computer to extract a stream partitioned by a prescribed time interval as a partial stream, from one or more real streams formed by continuous time series data, according to playback position information or timestamps of the real streams; a second computer program code for causing the computer to store a meta information related to a content of the partial stream, in relation to the partial stream; a third computer program code for causing the computer to receive a selection request formed by a selection meta information; a fourth computer program code for causing the computer to select corresponding partial streams by using the meta information according to the selection request; and a fifth computer program code for causing the computer to output the corresponding partial streams selected by the fourth computer program code to a client that made the selection request.

According to another aspect of the present invention there is provided a computer program product for causing a computer to function as a stream processing system, the computer program product comprising: a first computer program code for causing the computer to extract a stream partitioned by a prescribed time interval as a partial stream, from one or more real streams formed by continuous time series data, according to playback position information or timestamps of the real streams; a second computer program code for causing the computer to produce a virtual stream by concatenating one or more partial streams extracted by the first computer program code so as to enable a continuous playback; a third computer program code for causing the computer to extract a stream partitioned by another prescribed time interval as a partial virtual stream, from the virtual stream, according to playback position information or timestamps of the virtual stream; and a fourth computer program code for causing the computer to store a meta information related to a content of the partial virtual stream, in relation to the partial virtual stream.

Other features and advantages of the present invention will become apparent from the following description taken in conjunction with the accompanying drawings.

BRIEF DESCRIPTION OF THE DRAWINGS

FIG. 1 is a block diagram showing a schematic configuration of a stream processing system according to the first embodiment of the present invention.

FIG. 2 is a diagram showing relationships among a real stream, a partial stream, a virtual stream and a partial virtual stream that are used in the stream processing system of FIG. 1.

FIG. 3 is a diagram showing a virtual stream information table used in the stream processing system of FIG. 1.

FIG. 4 is a diagram showing a meta information table used in the stream processing system of FIG. 1.

FIG. 5 is a diagram showing a table of meta information attached to partial virtual stream that is used in the stream processing system of FIG. 1.

FIG. 6 is a diagram showing a first part of an exemplary composite contents that can be used in the stream processing system of FIG. 1.

FIG. 7 is a diagram showing a second part of an exemplary composite contents that can be used in the stream processing system of FIG. 1.

FIG. 8 is a diagram showing a third part of an exemplary composite contents that can be used in the stream processing system of FIG. 1.

FIG. 9 is a diagram showing a fourth part of an exemplary composite contents that can be used in the stream processing system of FIG. 1.

FIG. 20 is a diagram showing an exemplary composite contents stored in a composite contents storage unit in the stream processing device of FIG. 19.

FIG. 30 is a diagram showing an exemplary contents that can be used in the stream processing device of FIG. 27.

DETAILED DESCRIPTION OF THE INVENTION

Figure 10:
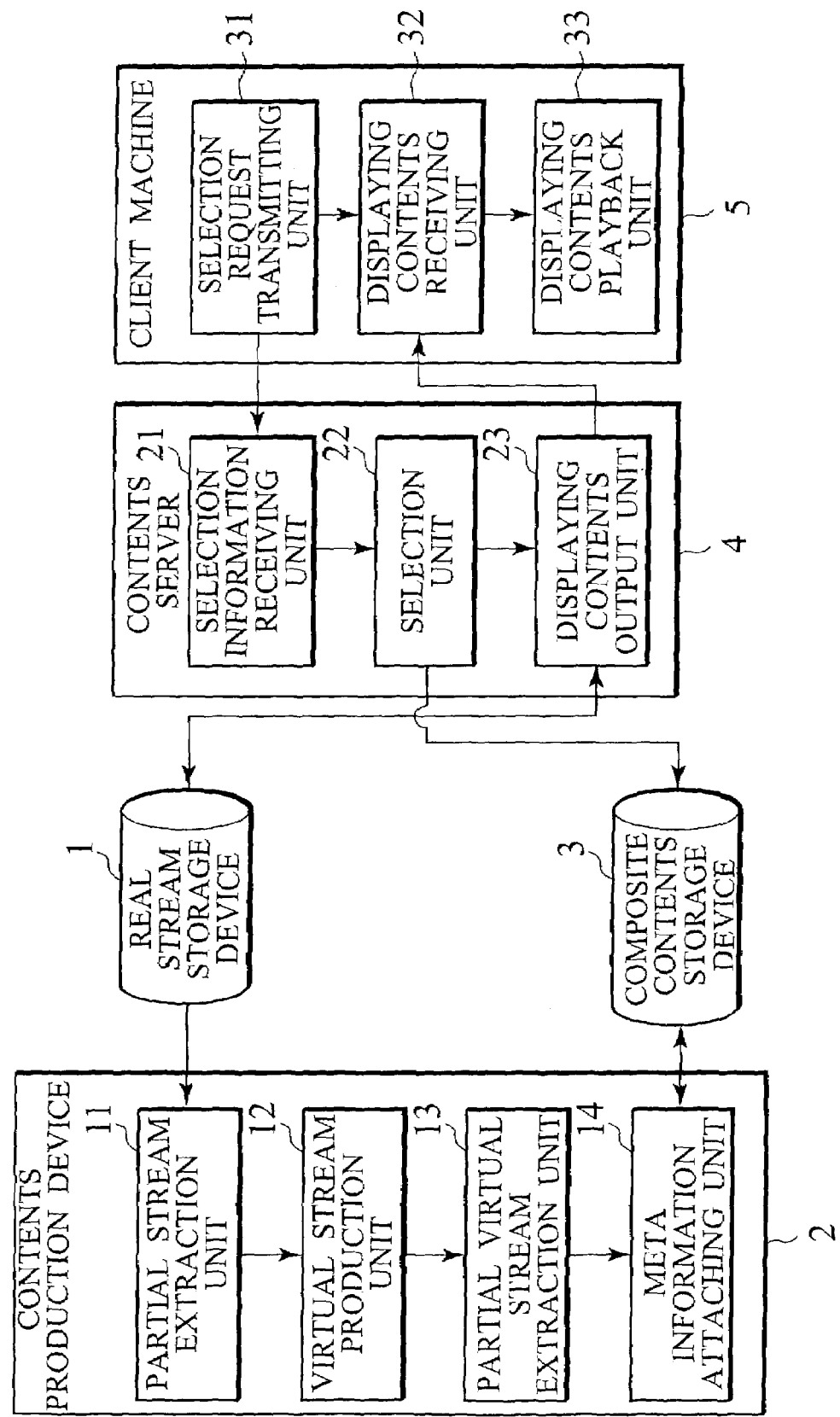
FIG. 10 is a block diagram showing a detailed configuration of the stream processing system shown in FIG. 1.

Referring now to FIG. 1 to FIG. 18, the first embodiment of a stream processing system according to the present invention will be described in detail.

FIG. 1 shows a schematic configuration of a stream processing system according to the first embodiment of the present invention.

The stream processing system of FIG. 1 comprises a real stream storage device 1, a contents production device 2, a composite contents storage device 3, a contents server 4, and a client machine 5.

The real stream storage device 1 stores a real stream which is continuous time series data such as video/audio/music data.

The contents production device 2 produces composite contents in which a meta information to be described below is attached to a virtual stream obtained by extracting and concatenating one or more partial streams specified by a user from the real stream. The produced composite contents are stored in the composite contents storage device 3.

The contents server 4 takes out the composite contents from the composite contents storage device 3 according to an access request of the client machine 5 and transmits the composite contents to the client machine 5.

FIG. 2 shows a relationship among a real stream, a partial stream, a virtual stream, and a partial virtual stream.

The real stream is time series data produced by a digital video camera or the like.

The partial stream is a stream obtained by extracting a part of the real stream by specifying times.

The virtual stream is a stream formed by at least one partial stream. The virtual stream is a virtual entity which is formed by an identifier for uniquely identifying the virtual stream, and an information regarding partial streams that constitute the virtual stream, i.e., an identifier, a start time information and an end time information of each corresponding real stream, as shown in FIG. 3. Here, the identifier of the real stream is a character string that can uniquely identify the real stream.

The partial virtual stream is a stream obtained by extracting a part of the virtual stream by specifying times. It is possible to attach one or more meta information to the partial virtual stream.

Here, the meta information is information regarding a corresponding partial virtual stream, which is formed by a title, a text, keywords and link information, for example, as shown in FIG. 4. The title indicates an outline of the partial virtual stream. The text indicates a content of the partial virtual stream. The keywords are information to be used in the case of selecting the partial virtual stream. The link information is information indicating links to other meta information related to the meta information.

FIG. 5 shows a table of meta information to be attached to the partial virtual stream. As shown in FIG. 5, the meta information table comprises a start time and an end time for indicating a specific time interval in the partial virtual stream and a meta information corresponding to that time interval.

The composite contents are produced by combining the virtual stream information shown in FIG. 3 and the meta information shown in FIG. 5. The composite contents are described as shown in FIG. 6 to FIG. 9, for example.

There are two reasons for producing the virtual stream and describing the meta information for the virtual stream in this way, rather than directly describing the meta information with respect to the real stream.

One reason is that there are cases where the other information cannot be described depending on a format of the real stream, but by producing the virtual stream, it is possible to describe the meta information in a uniform format with respect to streams of various formats.

Another reason is that it becomes easier to provide a plurality of different descriptions with respect to a single real stream in this way.

FIG. 10 shows a detailed configuration of the stream processing system shown in FIG. 1. The contents production device 2 has a partial stream extraction unit 11, a virtual stream production unit 12, a partial virtual stream extraction unit 13, and a meta information attaching unit 14.

Figure 11:
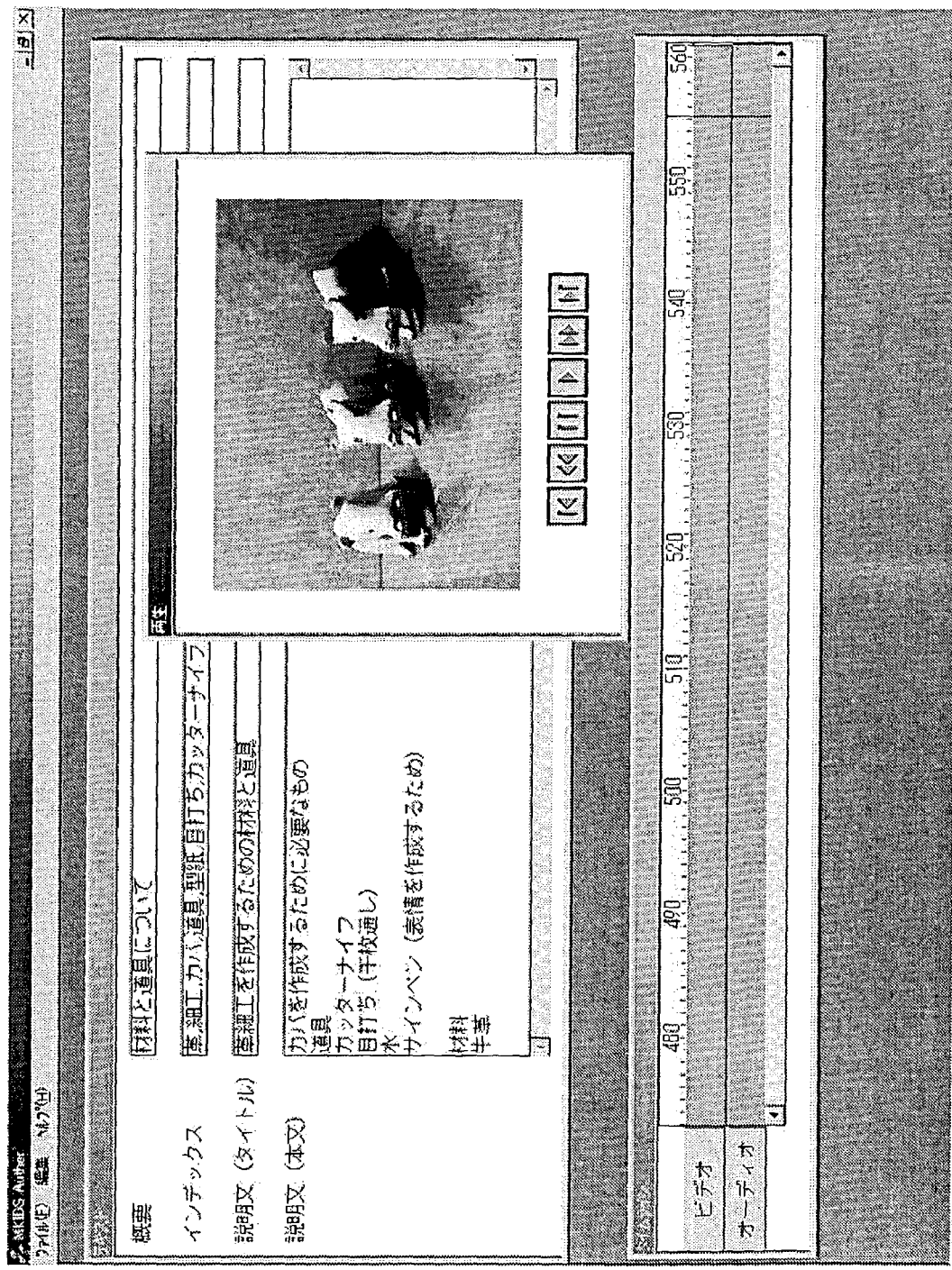
FIG. 11 is a diagram showing an exemplary user interface used by a contents production device in the stream processing system of FIG. 10.

The partial stream extraction unit 11 extracts the partial stream of the interval specified by the user from the real stream taken out from the real stream storage device 1. FIG. 11 shows a user interface used by the contents production device 2. The user extracts the partial stream by using a display as shown in FIG. 11.

The virtual stream production unit 12 produces the virtual stream by concatenating one or more partial streams.

The partial virtual stream extraction unit 13 produces the partial virtual stream by extracting a stream of an interval specified by the user from the produced virtual stream.

The meta information attaching unit 14 produces the composite contents in which the meta information is attached to the produced partial virtual stream.

The contents server 4 has a selection information receiving unit 21, a selection unit 22, and a displaying contents output unit 23.

The selection information receiving unit 21 receives a selection information from the client machine 5.

The selection unit 22 selects the composite contents stored in the composite contents storage device 3.

The displaying contents output unit 23 takes out one or more real streams from the real stream storage device 1 according to the composite contents selected by the selection unit 22, and transmits them to the client machine 5 as a continuous stream.

The client machine 5 has a selection request transmitting unit 31, a displaying contents receiving unit 32, and a displaying contents playback unit 33.

The selection request transmission unit 31 transmits information regarding contents selected by the user to the contents server 4.

The displaying contents receiving unit 32 receives the composite contents transmitted from the contents server 4 according to the selection made by the user.

Figure 12:
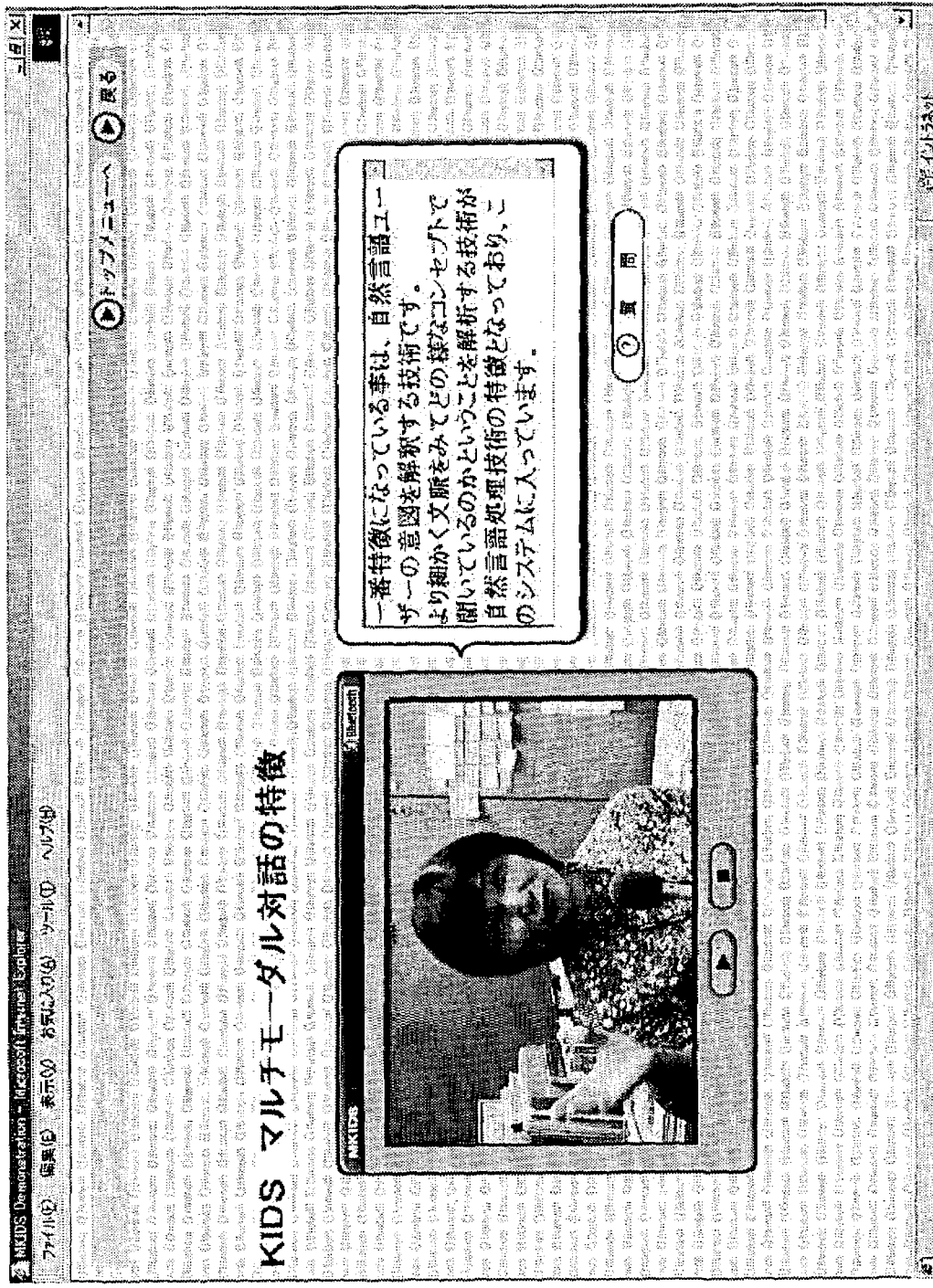
FIG. 12 is a diagram showing an exemplary content playbacked by a displaying contents playback unit in the stream processing system of FIG. 10.

The displaying contents playback unit 33 playbacks the composite contents received by the displaying contents receiving unit 32. FIG. 12 shows an exemplary contents playbacked by the display contents playback unit 33.

Figure 13:
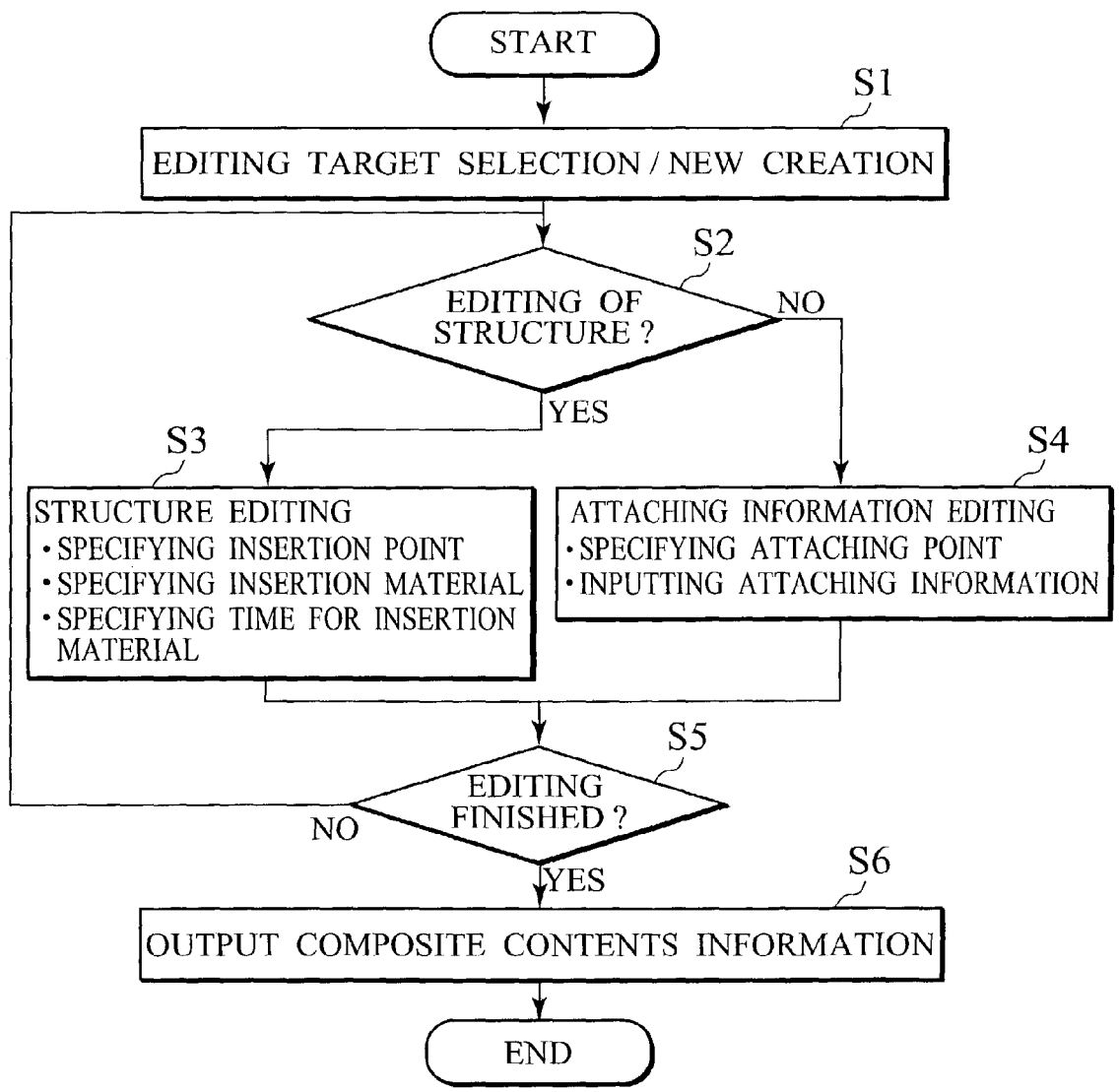
FIG. 13 is a flow chart showing an exemplary processing operation of a contents production device in the stream processing system of FIG. 10.

Next, the processing operation of the contents production device 2 will be described in detail. FIG. 13 shows an exemplary processing operation of the contents production device 2.

First, an editing target contents is selected. More specifically, either the existing composite contents is selected or a newly produced composite contents is set as the editing target (Step S1).

Then, the user is urged to select either an editing of the structure or an editing of a meta information to be attached (step S2), and if it is the editing of the structure, the user is urged to specify which part of the real stream should be inserted into where (step S3). Also, if it is the editing of the meta information, the user is urged to specify which part of the virtual stream should the meta information be attached, and to enter the meta information to be attached (step S4). If the editing is not finished, the processing returns to the step S2 (step S5), whereas if the editing is finished, the result is outputted as the composite contents (step S6).

In the case of specifying a part of the virtual stream in the editing of the meta information to be attached, the start time and the end time can be specified on a timeline (time axis), but it is also possible to use any of the following methods for specifying a part of the virtual stream.

One method is to automatically calculate the end time when the start time is specified by the user, in the case of attaching information that only needs to be displayed for a certain period of time from a certain time, such as an introduction of the casts. For example, the end time can be set five seconds after the start time.

Another method is that, when the start time is specified by the user, a break in the speech since that time, i.e., a time when the volume becomes zero, is detected and that time is set as the end time, in the case of attaching information regarding the audio information of the stream.

Another method is that, when the start time is specified by the user, a scene change point since that time is detected and that time is set as the end time, in the case of attaching information regarding the video information.

It is also possible to set the start time and the end time according to an interval during which a telop is displayed and automatically attach information regarding the content of the telop, by utilizing a technology for detecting and recognizing the telop in the video information. It is also possible to set the start time and the end time according to an interval during which a speech is uttered and automatically attach information regarding the content of the speech, by utilizing the speech recognition technology.

Note that the detection of the scene change point or the telop in the video can be realized by utilizing the existing technology. There are also commerially available products for automatically detecting a scene change point in the video.

There can be cases where the automatic setting of the start time and the end time based on the detection of the scene change point may not work well depending on the recording state of the real stream, so that it is preferable to set in advance a maximum size of the attaching time as 30 seconds, for example, and additionally provide a processing to set the end time as the start time plus the maximum attaching time in the case where the automatically set end time exceeds the start time plus the maximum attaching time.

Figure 14:
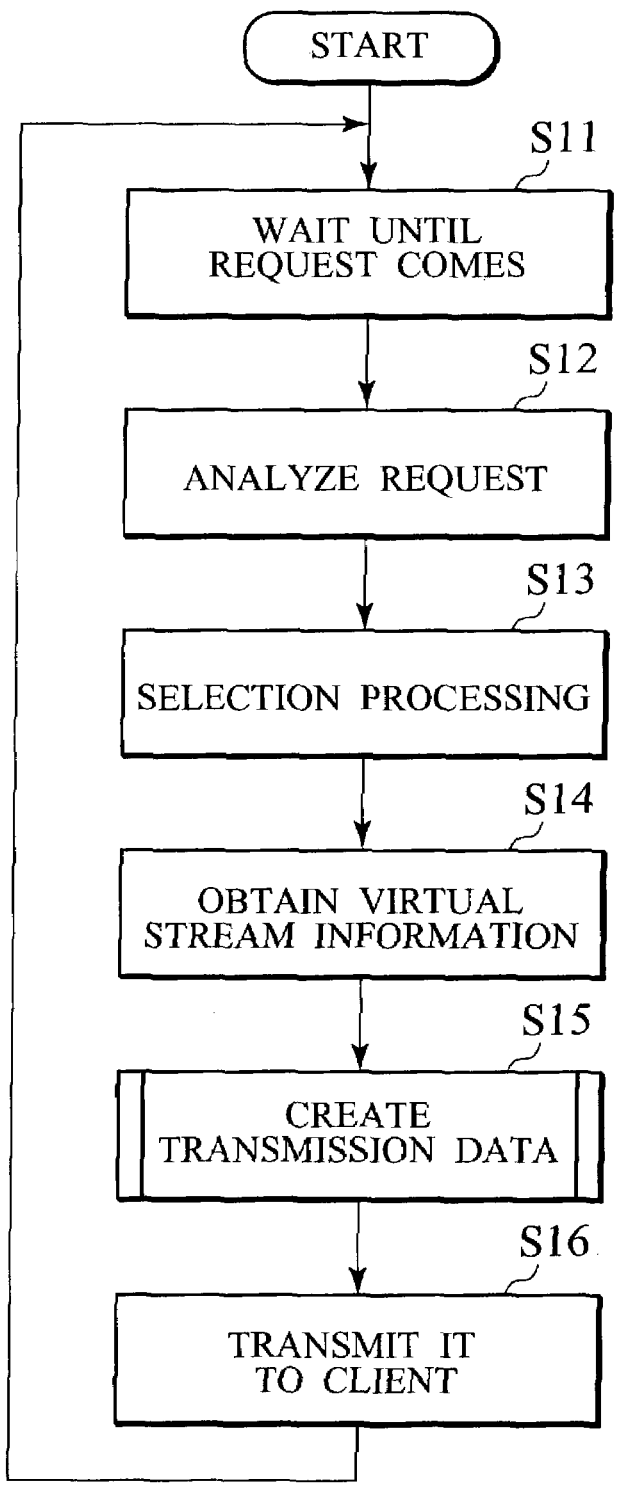
FIG. 14 is a flow chart showing an exemplary processing operation of a contents server in the stream processing system of FIG. 10.

Next, the processing operation of the contents server 4 will be described in detail. FIG. 14 shows an exemplary processing operation of the contents server 4.

First, it waits until a request from the client machine 5 comes (step S11), and then analyzes the arrived request (step S12).

The request from the client machine 5 contains a meta information for selection, that is an information for selecting desired composite contents to be displayed, such as keywords or an identifier, for example. According to this meta information for selection, one or a plurality of the composite contents are selected (step S13), the virtual stream information is obtained from the selected composite contents (step S14), and output contents to be transmitted to the client machine 5 is produced (step S15) and transmitted to the client machine 5 (step S16).

When a plurality of the composite contents to be displayed are selected, the composite contents to be displayed first is determined by urging the user to select one by sending a list of the selected composite contents to the client machine 5, or the selected composite contents are arranged in an order according to some criteria such as the number of matching keywords and transmitting the composite contents in this order sequentially to change the displayed composite contents according to an operation request from the client machine 5.

There are two major methods for transmitting the composite contents to be displayed.

One method is that in which the selected composite contents, that is the structure information for the virtual contents and the meta information attached to that virtual contents, are directed transmitted, the client machine 5 interprets them and issues commands to the contents server 4 according to the need so as to playback the contents.

For example, in the case where the selection result is the virtual stream shown in FIG. 3, the client machines 5 requests the contents server 4 to concatenate a part of the stream A from the time Ta1 until the time Ta2 and a part of the stream B from the time Tb1 until the time Tb2 and transmit it to the client machine 5.

Another method is that in which the information is interpreted in advance at the contents server 4 and only the information necessary for the playback is transmitted to the client machine 5.

For example, in the case where the selection result is the virtual stream shown in FIG. 3, the information of FIG. 6 to FIG. 9 is described in a manner that can be interpreted by the client machine 5 and transmitted, and when the stream playback request is received from the client machine 5, a part of the stream A from the time Ta1 until the time Ta2 and a part of the stream B from the time Tb1 until the time Tb2 are concatenated and transmitted to the client machine 5.

The first method has an advantage in that the display can be controlled by the client machine 5, but the calculation load is exerted on the client machine 5. The second method does not exert the calculation load on the client machine 5, but the client machine 5 cannot control the display independently, and the calculation load is exerted on the contents server 4. Which method should be used can be determined according to the scale of the system and the calculation powers of the contents server 4 and the client machine 5.

Figure 15:
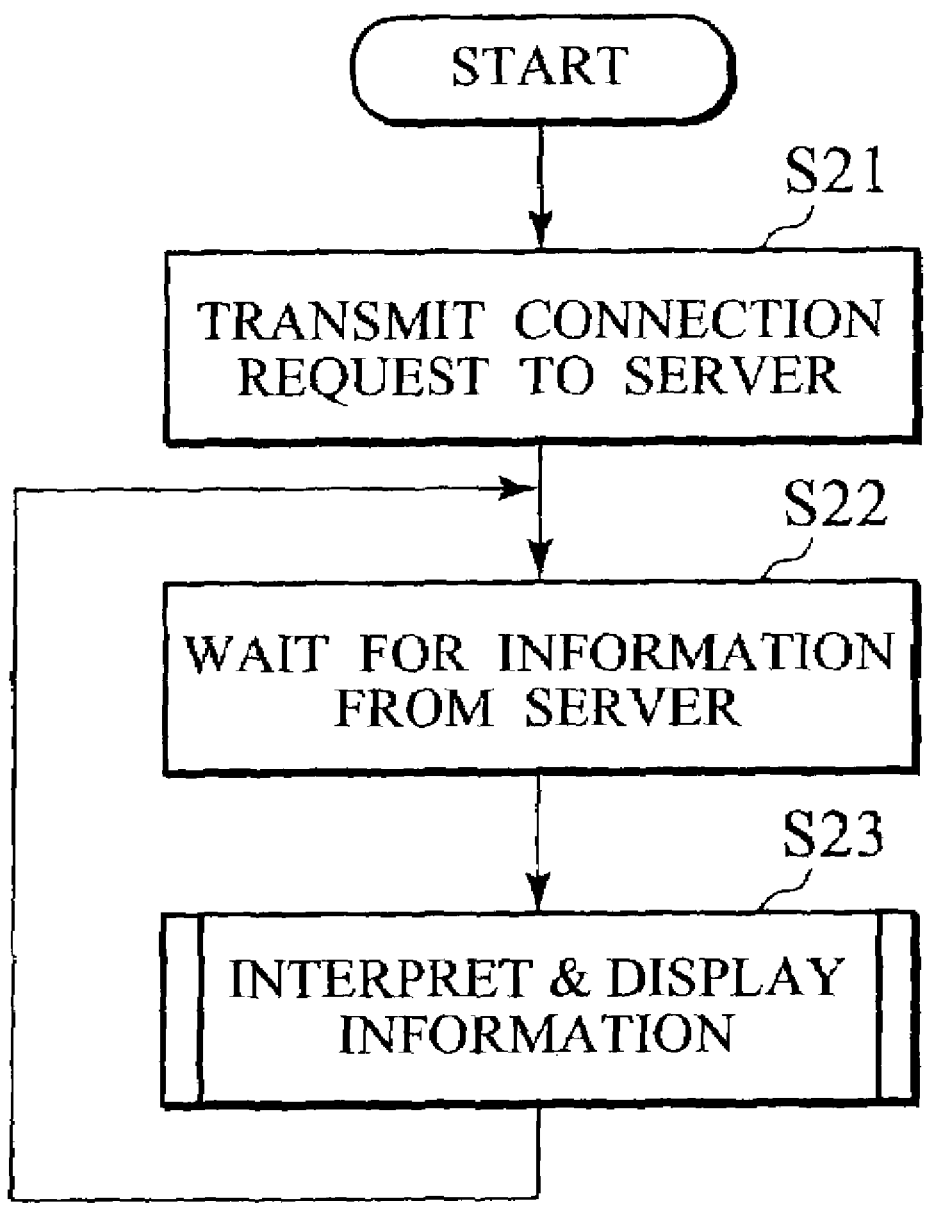
FIG. 15 is a flow chart showing an exemplary processing operation of a client machine in the stream processing system of FIG. 10.

In the following, the processing operation of the client machine 5 in the case of adopting the second method will be described in detail. FIG. 15 shows an exemplary processing operation of the client machine 5.

First, at a time of the activation of the client machine 5, an access request is transmitted to the contents server 4 (step S21). Then, it waits until the information comes from the contents server 4 (step S22), and the received information is interpreted and displayed (step S23).

Figure 16:
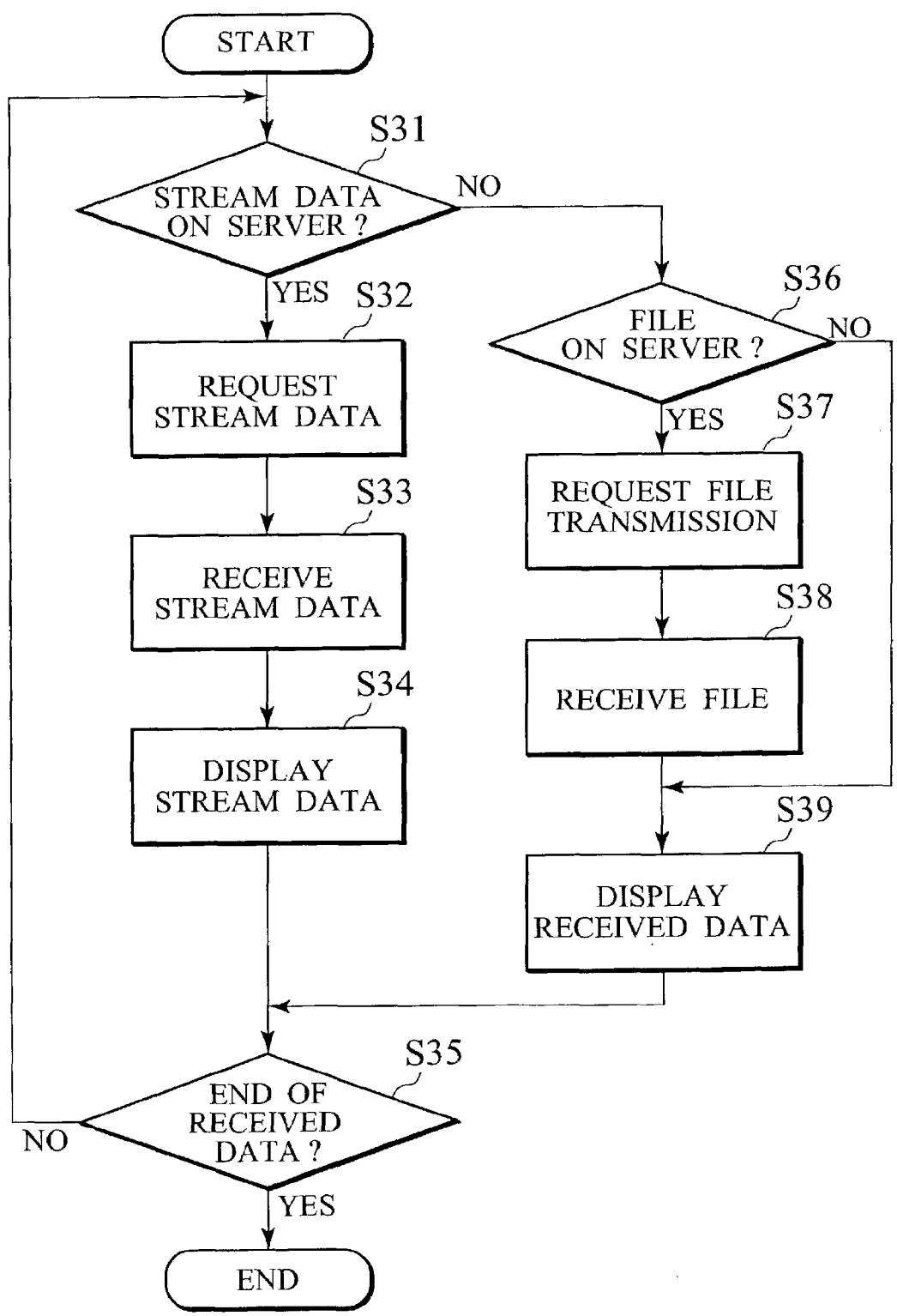
FIG. 16 is a flow chart showing a detailed processing of a step S23 of FIG. 15.

In further detail, the processing of this step S23 is carried out by the procedure shown in FIG. 16. First, whether the received information is a link to a stream on the contents server 4 or not is judged (step S31), and if so, the stream data are requested to the contents server 4 (step S32). Then, the requested stream data are received (step S33) and these data are displayed (step S34).

If the received information is a link to a file on the contents server 4 (step S36 YES), a file transmission request is made to the contents server 4 (step S37), a file is received (step S38), and a received file is displayed (step S39). If the received information is other than these (step S36 NO), it is displayed as it is (step S39).

The processing of the steps S31 to S39 is repeated until the end of the received data.

Figure 17:
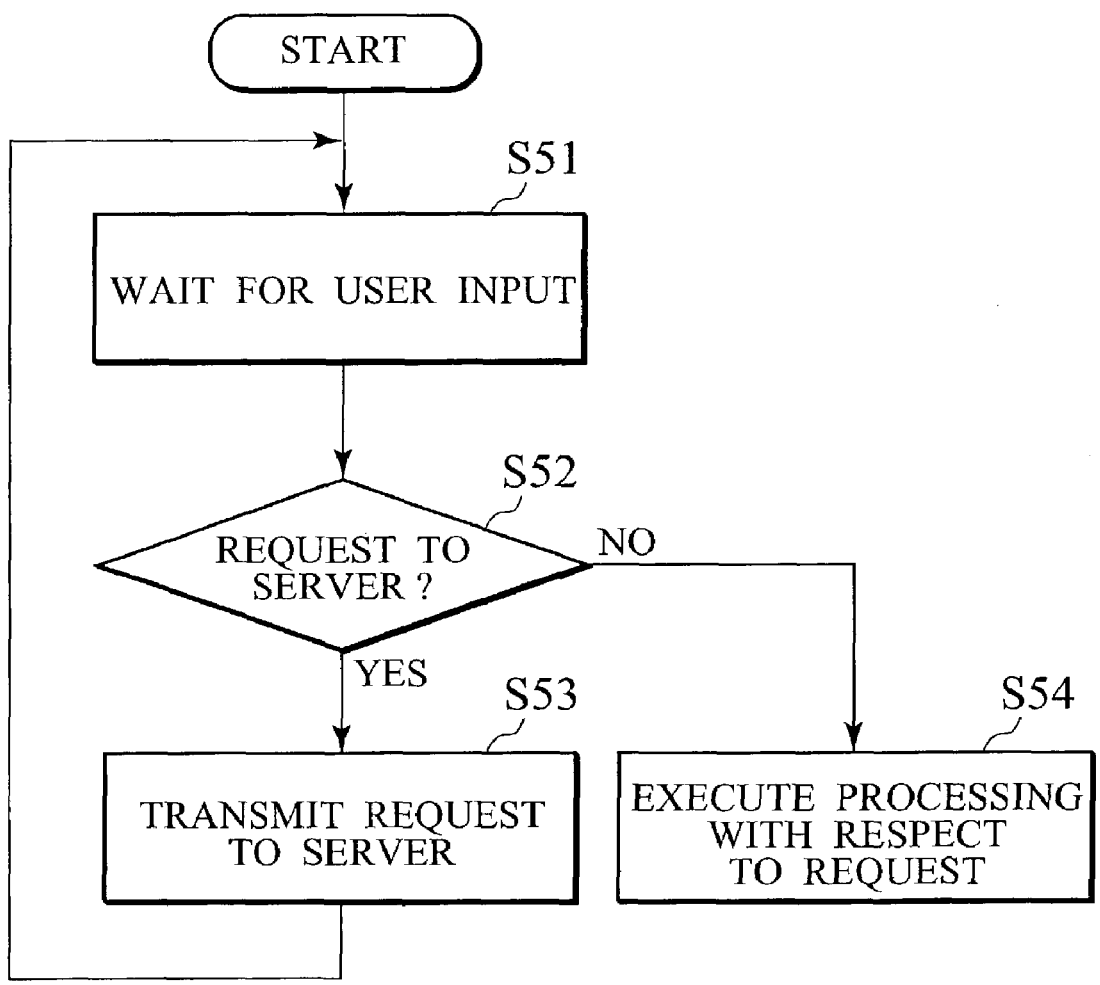
FIG. 17 is a flow chart showing an exemplary processing operation of a user operation processing in the stream processing system of FIG. 10.

Next, the user input processing at the client machine 5 will be described in detail. FIG. 17 shows an exemplary processing operation for the user operation processing.

When there is a user input from a keyboard, a mouse, a speech input device or the like (step S51), whether it is a request to the contents server 4 such as a selection request or a local processing on the client machine 5 is judged (step S52), and if it is a request to the contents server 4, it is transmitted to the contents server 4 (step S53), whereas if it is a local processing on the client machine 5, that processing is executed (step S54).

Figure 18:
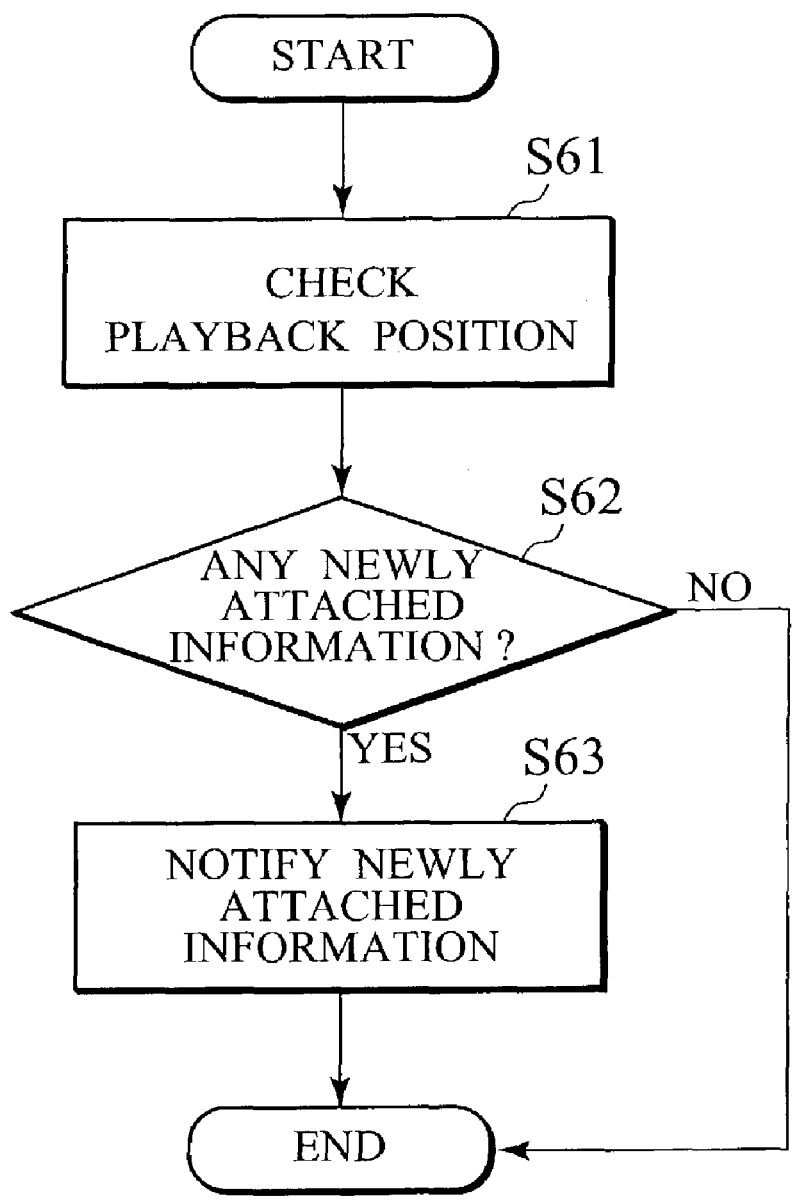
FIG. 18 is a flow chart showing an exemplary method for playbacking meta information attached to a virtual stream at a client machine in the stream processing system of FIG. 10.

Next, a playback method for the meta information attached to the virtual stream at the client machine 5 will be described with reference to FIG. 18.

During the playback of the stream data, the playback position is read out at a prescribed interval (step S61), and whether there is a new attached information at that time or not is judged (step S62). If there is a new attached information, it is notified to the user by a display on a screen or a sound (step S63).

More specifically, the notification method using a display on a screen is as follows. From the start time until the end time, a dialogue box is displayed in a pop-up format on the playback screen, and the character string for the title of the meta information is displayed therein.

When the display period overlaps with the other meta information, either they are displayed in a single dialogue box in a list form with a newer one put on a higher position or they are displayed in a plurality of dialogue boxes.

As described, the first embodiment is directed to the stream processing system which has: the composite contents production device 2 for producing the composite contents by combining one or a plurality of real streams and attaching the meta information which is capable of expressing the related information in another format such as text; the contents server 4 for selecting the composite contents to be displayed from a plurality of composite contents according to a request from the client machine 5 and transmitting it to the client contents; and the client machine 5 for interpreting the contents information transmitted from the contents server 4 and displaying it to the user, and transmitting a request to the contents server 4 upon receiving an operation request from the user.

Conventionally, the related information has been described by directly editing the real stream, but in this embodiment, the stream is handled through a file called virtual stream which only has the structure information, so that the time required in proportion to the length of the editing target stream which becomes necessary in order to reconstruct the data as the real stream again by editing the real stream can be shortened, and the storage capacity that becomes necessary in order to store the reconstructed real stream can be reduced.

In addition, the composite contents are produced by describing the meta information with respect to the partial virtual stream, so that the related information can be attached in a form that does not depend on a file format of the real stream, and the time series data in general such as the video data and the various sensor data can be handled similarly.

In this way, it becomes possible to realize the selection function in the case of selecting the composite contents from a plurality of composite contents according to the purpose, independently from a format of the real stream, and it becomes possible to easily incorporate various selection functions such as the selection function having a sophisticated knowledge processing, the selection function with the main focus on the speed, etc.

Referring now to FIG. 19 to FIG. 25, the second embodiment of a stream processing system according to the present invention will be described in detail.

The second embodiment is directed to the stream processing system which presents an arbitrary contents to the user, and selects the desired contents of the user according to a selection request given by the user from a plurality of contents that are related to that arbitrary contents. The second embodiment is also directed to the stream processing device which is capable of making the selection even when the selection request given by the user is an incomplete one such as one that lacks the subject word or one that uses a demonstrative term, by complementing the incompleteness of the selection request by utilizing information on the contents watched or listened at a time the user made the selection request.

Figure 19:
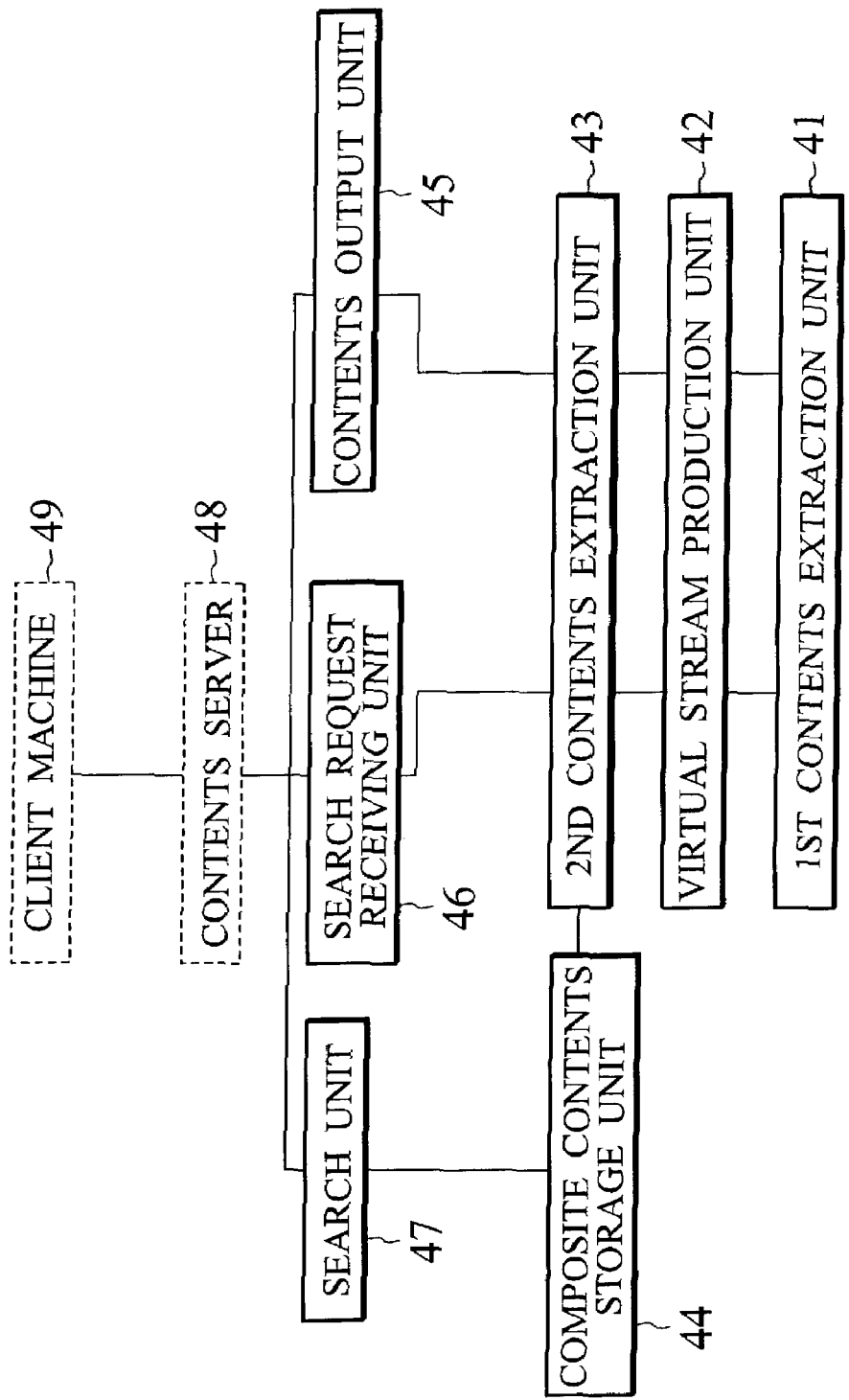
FIG. 19 is a block diagram showing a schematic configuration of a stream processing device according to the second embodiment of the present invention.

FIG. 19 shows a schematic configuration of the stream processing device according to the second embodiment of the present invention. The stream processing device of FIG. 19 has a first contents extraction unit 41, a virtual stream production unit 42, a second contents extraction unit 43, a composite contents storage unit 44, a contents output unit 45, a search request receiving unit 46, a search unit 47, a contents server 48, and a client machine 49.

The first contents extraction unit 41 extracts a first contents which is partitioned by the time information, from the time series data.

The virtual stream production unit 42 produces a virtual stream that records the access information such that at least one first contents can be playbacked continuously.

The second contents extraction unit 43 extracts a second contents which is partitioned by the time information, from the virtual stream.

The composite contents stored in the composite contents storage unit 44 comprise the real stream or the virtual stream and the meta information related to that stream, as described in the first embodiment.

FIG. 20 shows exemplary composite contents stored in the composite contents storage unit 44. FIG. 20 shows an exemplary case that contains two composite contents each of which is formed by the second contents and the meta information. These two contents constitute a single virtual stream.

Namely, by the virtual stream, it is specified to continuously playback a part from 13 minutes and 6 seconds until 15 minutes and 24 seconds of the real stream a0013.mov, a part from 0 minutes and 12 seconds until 3 minutes and 19 seconds of the real stream a0025.mov, a part from 9 minutes and 43 seconds until 12 minutes and 32 seconds of the real stream a0102.mov, and so on.

In this virtual stream, the meta information "ecology of whales" is related to the first section of 5 minutes and 25 seconds duration. Also, the meta information "ecology of penguins" is related to a section from 5 minutes and 25 seconds until 15 minutes and 43 seconds.

Figure 21:
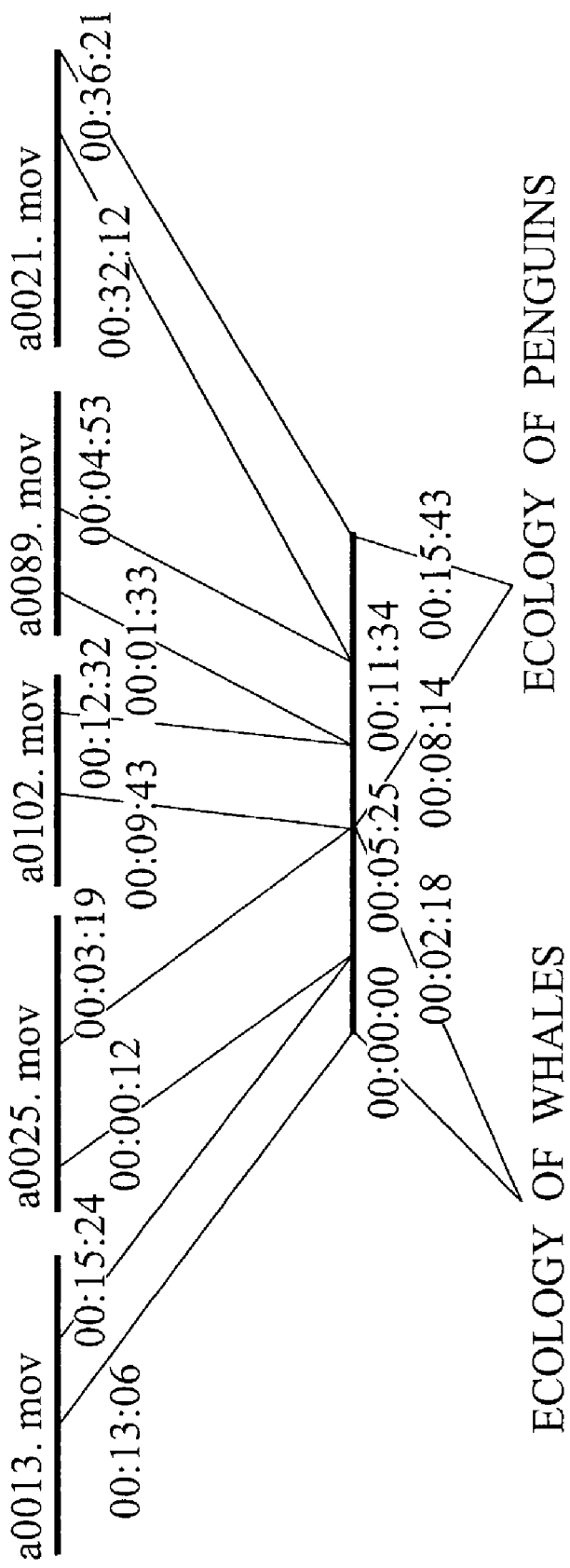
FIG. 21 is a diagram showing a structure of composite contents used in the stream processing device of FIG. 19.

FIG. 21 schematically shows a structure of the composite contents. The contents output unit 45 outputs arbitrary composite contents stored in the composite contents storage unit 44 to the client machine 49.

Next, an exemplary search (selection) processing to be carried out by the search unit 47 will be described with reference to FIG. 22.

First, the composite contents containing the real stream specified by the real stream identifier of the playback information as the first contents are selected (step S71).

Then, the composite contents are narrowed down to those contained within a range of the playback position information or the timestamps of the first contents, according to the playback position information (step S72).

Then, the text (meta) informations corresponding to the narrowed down composite contents are obtained (step S73). Then, the obtained text (meta) informations are merged to a search (selection) request (step S74), and the search (Selection) is executed (step S75).

Figure 23:
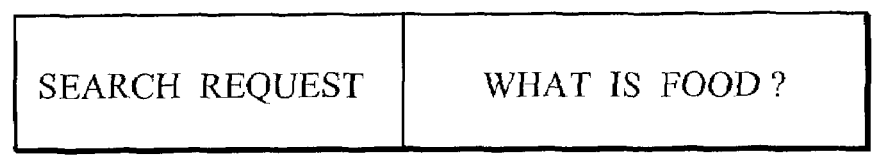
FIG. 23 is a diagram showing an exemplary search (selection) request used by a search unit in the stream processing device of FIG. 19.
Figures 24, 25, 26:
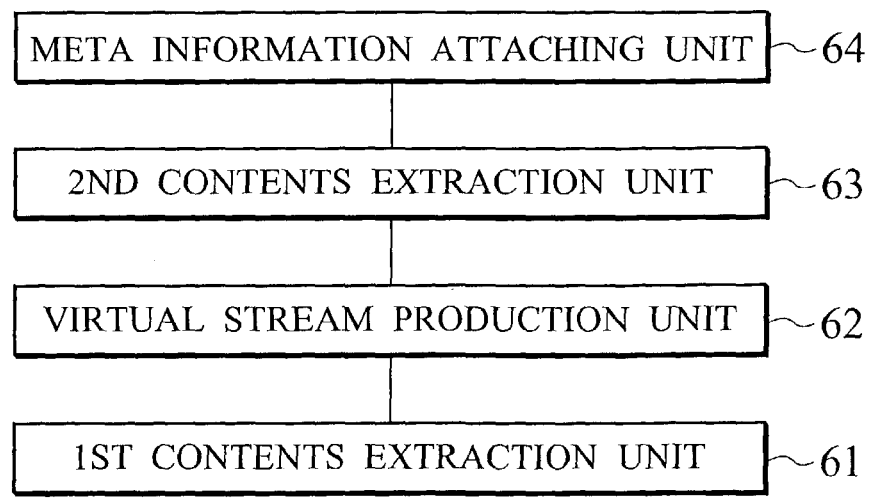
FIG. 24 is a diagram showing an exemplary audio/visual information used by a search unit in the stream processing device of FIG. 19.
FIG. 25 is a diagram showing an exemplary merged search (selection) request used by a search unit in the stream processing device of FIG. 19.
FIG. 26 is a block diagram showing a schematic configuration of a stream processing device according to the third embodiment of the present invention.

Next, the processing operation of the second embodiment will be described by using a concrete example. FIG. 23 shows an exemplary search (selection) request, and FIG. 24 shows an exemplary playback information.

Figure 22:
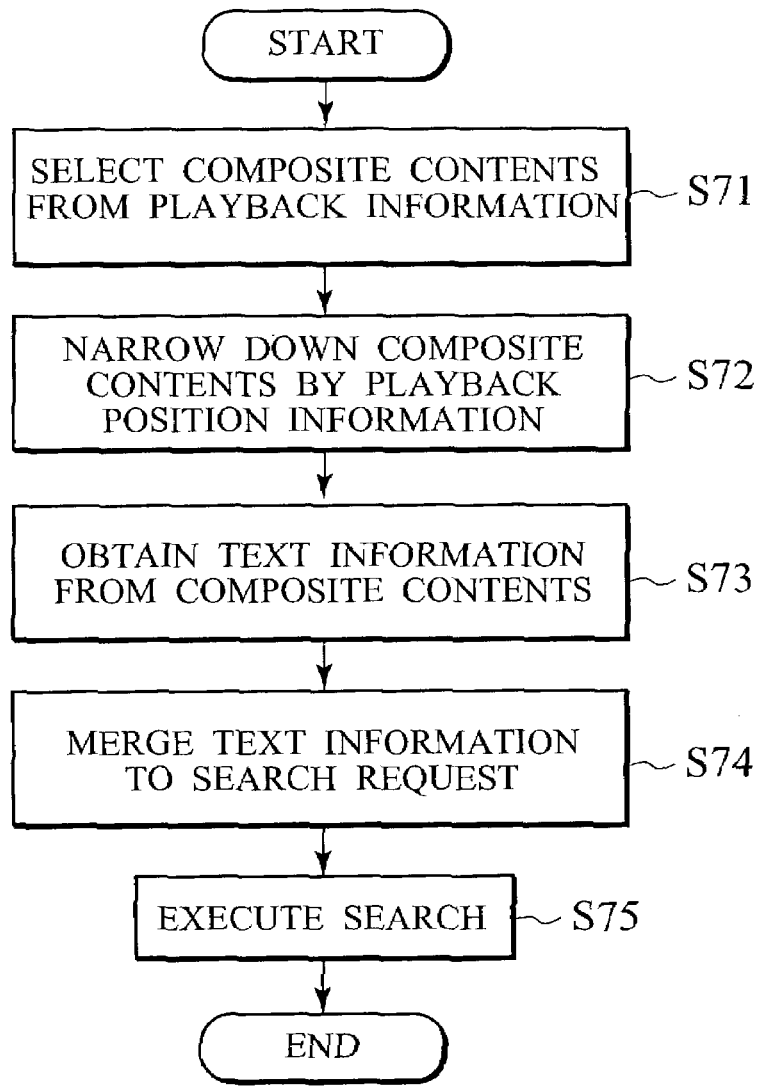
FIG. 22 is a flow chart showing an exemplary search (selection) processing of a search unit in the stream processing device of FIG. 19.

At the step S71 of FIG. 22, the composite contents containing the real stream identifier "a0102.mov" of the playback information as the first contents are selected.

Next, at the step S72, the composite contents which contain the playback position information "10 minutes and 22 seconds" within a range of the playback position information or the timestamps are selected from the composite contents obtained at the step S71. For example, in the case of the virtual stream of FIG. 20, the time series data and the time information contained in the first composite contents are matching with the playback information. Consequently, in this case, the meta information "ecology of whales" will be obtained at the step S73.

There can be cases where a plurality of virtual streams are produced with respect to an identical real stream. In such a case, a plurality of meta informations will be obtained by the step S73.

Then, at the step S74, the extracted meta information is merged to the search (selection) request. Here, this is done by a scheme by which the meta information to be merged is added to an end of the original search (selection) request. FIG. 25 shows an exemplary merged search (selection) request.

Then, at the step S75, the search (selection) processing is executed by using the merged search (selection) request "what is food? ecology of whales".

By carrying out the selection by complementing the selection request, it is possible to make the more narrowed down selection using the target subject of the user's attention as the selection target, even when the selection request does not contain information regarding an intended target of the user, for example.

Namely, with the original selection request "what is food?" alone, it is impossible to ascertain "food of what" is questioned by the user, but by utilizing the playback information regarding the time series data watched or listened by the user when the question is issued, it is possible to execute the selection by complementing the search request such that it is ascertained that the user is questioning about "food of whales".

As modifications of the above described second embodiment, it is possible to change the selection request merging method at the step S74 of FIG. 22, for example.

Modified Embodiment 1

Among the composite contents selected according to the playback information, only the statistically important words are added to the original selection request by using the statistical quantity such as TD-IDF (Term Frequency by Inverse Document Frequency) weights.

For example, when the meta information is obtained at the step S73 of FIG. 22, this meta information is subjected to the morphemic analysis to extract only the independent words, the TD-IDF weight of each independent word is checked, and only those independent words which have the weight value greater than or equal to a prescribed threshold are added to the selection request.

When the meta information "ecology of whales" is obtained at the step S73 of FIG. 22, the independent words contained in this meta information are "ecology" and "whales". When the TD-IDF weights of these independent words are "whales(0.8)" and "ecology(0.2)" and the prescribed threshold is 0.5, for example, the "whales" will be added at the step S74.

In this way, the reduction of the occurrences of noises due to the complement of the selection request can be expected.

Modified Embodiment 2

A demonstrative term identification knowledge unit and a demonstrative term identification unit are provided at external of the present system, and the merging is executed only in the case where the original selection request has a presupposed demonstrative term.

For example, consider the case where the demonstrative term identification knowledge unit has patterns like "this" and "that".

In the example of FIG. 20 to FIG. 24, if the selection request is "what is food of this?", the demonstrative term "this" is recognized, and the "ecology of whales" is merged at the step S74 of FIG. 22.

If the selection request is "what is food of crow?", no demonstrative term is recognized and the complement of the selection request is not carried out at the step S74 of FIG. 22.

Referring now to FIG. 26 to FIG. 30, the third embodiment of a stream processing system according to the present invention will be described in detail.

The third embodiment is directed to the stream processing system which selects the desired contents of the user according to a selection request given by the user, which is capable of making the selection even when the meta information related to the individual contents is an incomplete one such as one that lacks the subject word or one that uses a demonstrative term, by complementing the incompleteness of the individual contents by utilizing the time information of those contents which have the same time series data as the first time series data.

FIG. 26 shows a schematic configuration of the stream processing device according to the third embodiment of the present invention. The stream processing device of FIG. 26 has a first contents extraction unit 61, a virtual stream production unit 62, a second contents extraction unit 63, and a meta information attaching unit 64.

The first contents extraction unit 61 extracts a first contents which is partitioned by a prescribed time interval, from the first time series data.

The virtual stream production unit 62 produces a virtual stream that records the access information such that at least one contents extracted by the first contents extraction unit 61 can be playbacked continuously.

The second contents extraction unit 63 extracts a second contents which is partitioned by a prescribed time interval, from the virtual stream.

The meta information attaching unit 64 attaches the meta information related to the contents (SCk) extracted by the second contents extraction unit 63.

Figure 27:
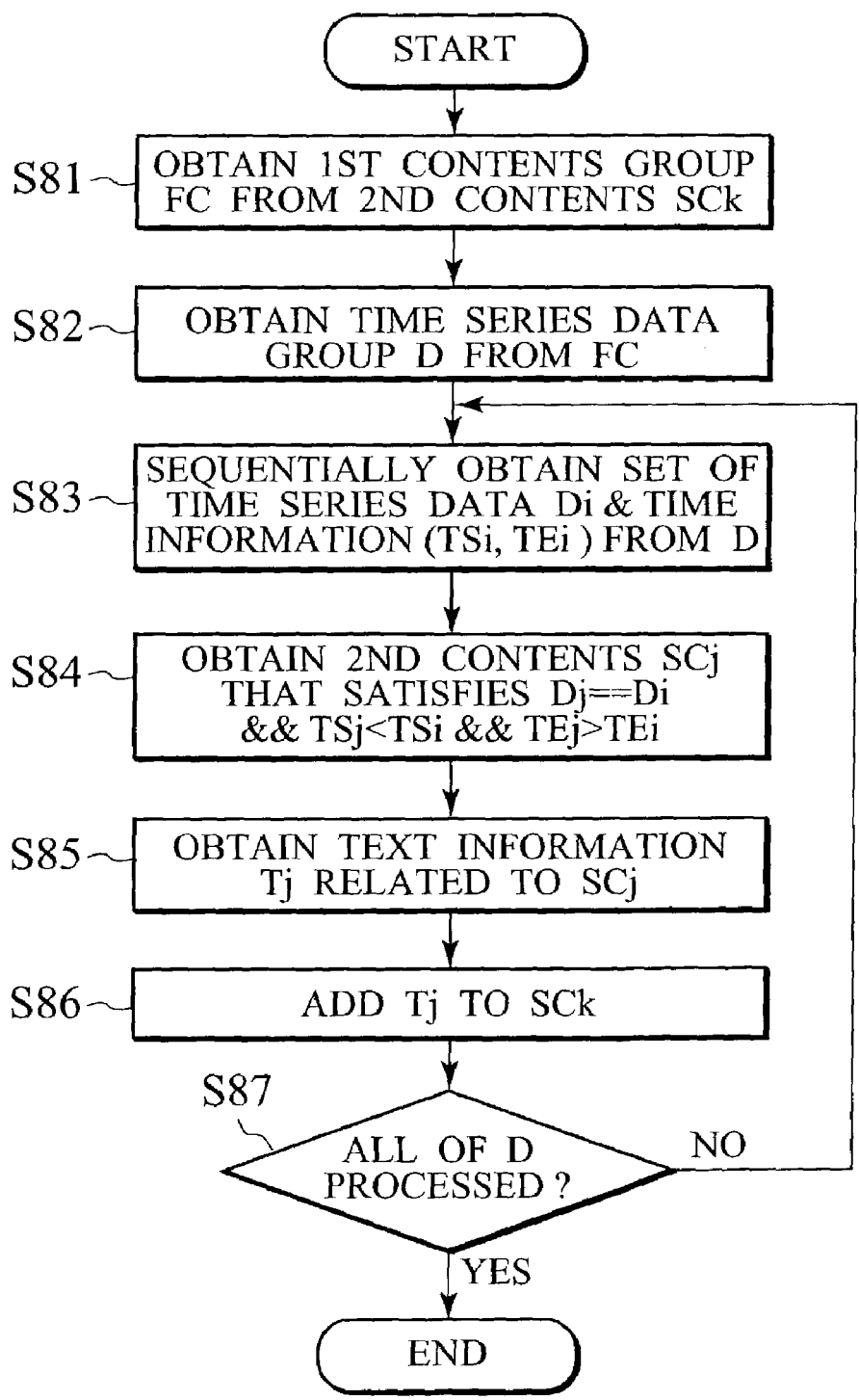
FIG. 27 is a flow chart showing an exemplary processing operation of a meta information attaching unit in the stream processing device of FIG. 27.

FIG. 27 shows an exemplary processing operation of the meta information attaching unit 64.

First, the first contents group (FC) contained in the second contents (SCk) of interest are obtained (step S81). Then, the first time series data group (D) are obtained from the first contents group (FC) (step S82).

Then, the time information (start point TSi, end point TEi) of a section corresponding to each time series data (Di) among the first time series data group (D) is obtained (step S83).

Then, the second contents (SCj) that can time-wise cover the start point TSi and the end point TEi (TSj<TSi && TEj>TEi) is selected, in the same first time series data (Di==Dj) (step S84).

Then, the meta information (Tj) corresponding to the second contents SCj is obtained (step S85). Then, the meta information Tj is attached to the second contents SCk (step S86). Then, the processing of the steps S83 to S86 is repeated until all of the first time series data D are processed (step S87).

Note that, at the step S84, in addition to checking the data that can time-wise cover the original data, it is also possible to carry out the processing for data that has a partial overlap time-wise or data that is contained in the original data time-wise.

Figure 28:
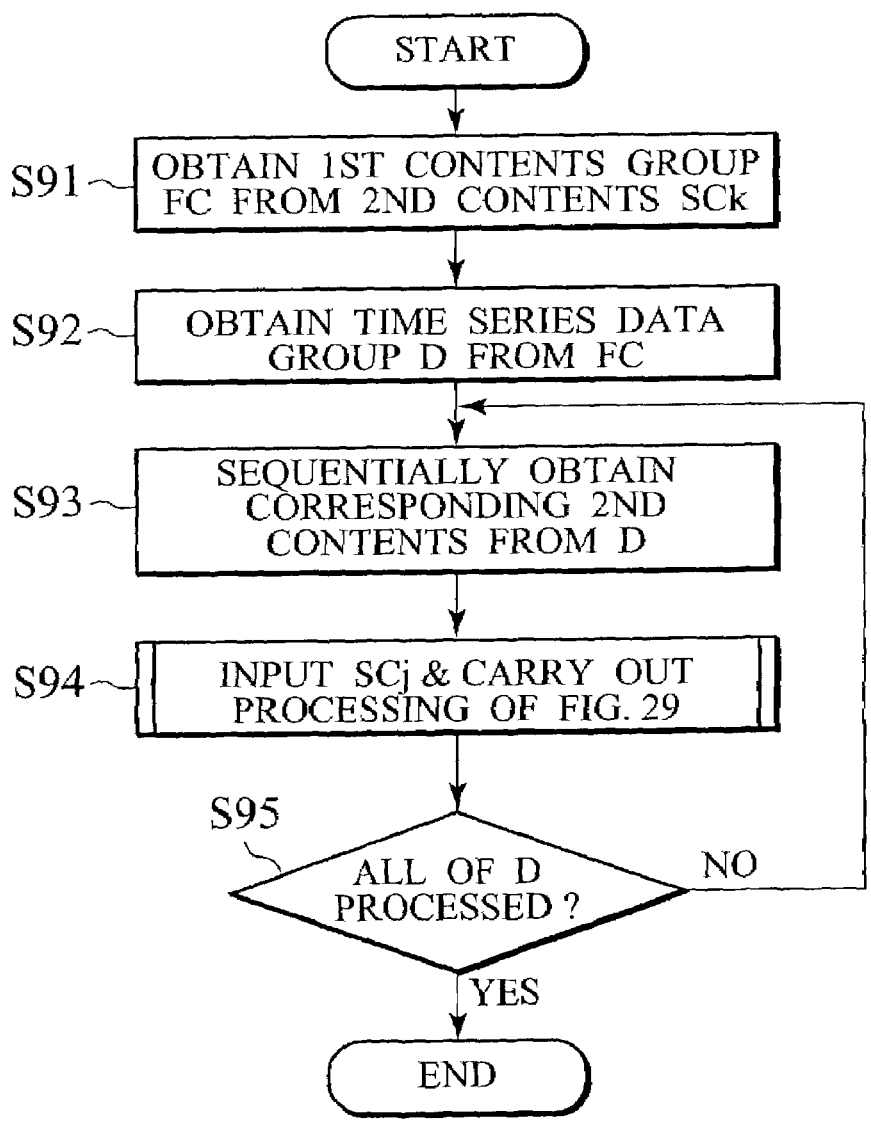
FIG. 28 is a flow chart showing a processing to attach text information to contents related to a contents to be deleted in the stream processing device of FIG. 27.

In the case of deleting the second contents from the system, the meta information attaching unit 64 attaches the text information to the contents related to the contents to be deleted, according to the processing shown in FIG. 28 as follows.

First, the first contents group (FC) contained in the second contents (SCk) to be deleted are obtained (step S91). Then, the first time series data group (D) is obtained from FC (step S92).

Figure 29:
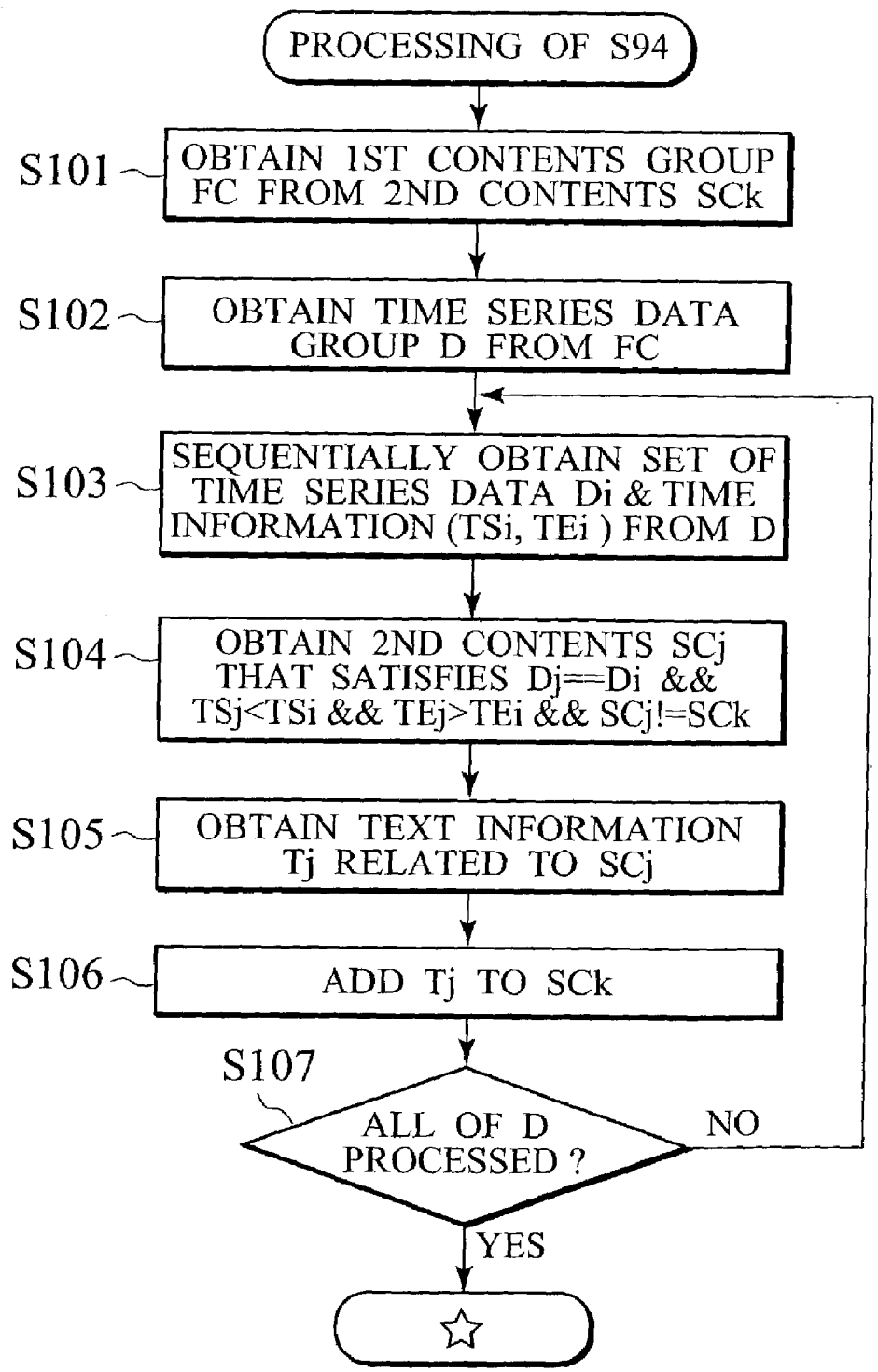
FIG. 29 is a flow chart showing a detailed processing of a step S94 of FIG. 28.

Then, the second contents group (SCi) that contain the time series data contained in D is sequentially obtained (step S93). Then, the processing shown in FIG. 29 is carried out by using each SCI as input (step S94). The processing of FIG. 29 is basically the same as that of FIG. 27, except that at the step S104 of FIG. 29, the second contents SCk is excluded from the text to be added.

Now, the third embodiment will be described by using a concrete example.

Consider the case where the contents 52 shown in FIG. 20 is the second contents SCk of interest, and the contents 53 shown in FIG. 30 also exists besides that.

When the condition formula of the step S84 of FIG. 27 is evaluated for the time information (start point, end point) of each time series data contained in the second contents SCk with respect to the time information of each time series data of FIG. 30, it becomes true for the contents 53 of FIG. 30 and the contents 52 in the contents 51 of FIG. 20, and the meta information "mammals and fishes living in ocean" related to the contents 53 is obtained as Tj.

At the step S86 of FIG. 27, the meta information "mammals and fishes living in ocean" is added to the meta information "ecology of whales" of the contents 51.

As a result, it becomes possible to select the meta information which is only described as "ecology of whales" in response to the selection request "tell me about the ecology of mammals living in ocean", in the case of selecting the meta information, for example.

By complementing the content of the meta information by utilizing the time-wise relationship of the contents in this way, it becomes possible to carry out the more accurate selection, even in the case where the individual meta information alone is insufficient in carrying out the selection.

As modifications of the above described third embodiment, it is possible to change the text adding method at the step S87 of FIG. 27, for example.

Modified Embodiment 1

A thesaurus is provided at external, and only those words which have a hierarchically higher relationship in the thesaurus with the words in the text related to the original contents of interest among the obtained meta information are added.

For example, consider the case where the meta information "mammals and fishes living in ocean" is obtained by the steps S84 and S85.

By the morphemic analysis to extract only the independent words from this meta information, the independent words "ocean", "living", "mammals" and "fishes" are obtained.

Similarly, the independent words "whales" and "ecology" are obtained from the meta information "ecology of whales" of SCk.

Then, the relationships among these word groups are checked on the thesaurus.

If the word "whales" is defined as a hierarchically lower concept of "mammals" on the thesaurus, and there is no other hierarchical relationship among the other words on the thesaurus, only "mammals" is added at the step S87 of FIG. 27.

In this way, it is possible to prevent the erroneous search of the contents 51 in response to the selection request "ecology of fishes living in ocean".

By utilizing the thesaurus in controlling the meta information complementing processing in this way, it is possible to reduce the occurrences of noises due to the complement of the text information.

As described, according to the present invention, the meta information related to the content of the partial stream is stored in relation to the partial stream, so that it is possible to comprehend the outline of the partial stream by using the meta information, regardless of the file format of the partial stream.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the stream processing device of each of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention.

Accordingly, all such modifications and variations are intended to be included within the scope of the appended claims.

What is claimed is:

1. A stream processing system comprising:
    a contents storage device operable to store a plurality of video contents;
    a contents production device including a user interface to:
        select a plurality of different video contents from among said plurality of video contents stored in said contents storage device,
        partition each of said plurality of different video contents into a plurality of partial video streams,
        select part of said plurality of partial video streams of each of said plurality of different video contents while selectively associating meta information items with the selected partial video streams, and
        create a composite content by combining the selected partial video streams of said plurality of different video contents together with said meta information, wherein said composite content contains information of each selected partial video stream as a virtual video stream comprising a start time and an end time of the partial video stream in each different video content;
    a contents server connected to said contents storage device and operable to provide a real video stream by reading said composite content from said contents storage device, parsing said composite content, reading the partial video streams from said contents storage device based on the respective virtual video streams of said composite content as parsed, and sequentially and continuously outputting the partial video streams as said real video stream together with said meta information items based on the respective virtual video streams of said composite content as parsed; and
    a client machine connected to said contents server and operable to receive said real video stream from said contents server and play back said real video stream to a user of said client machine;
    wherein each of said meta information items contains a title, a text, keywords, and link information, said text describing a content of the partial video stream corresponding to said each of said meta information items,
    wherein said client machine is operable to sequentially play back the partial video stream of each of said video contents and then play back the partial video stream of a next one of said video contents continuously from the end time of said each of said video contents, to the user of said client machine, such that said composite content is played back in the same manner as an individual video content, and
    wherein said client machine is operable to display, when one of the partial video streams is displayed during playing back said real video stream, one of said meta information items corresponding to said one of the partial video streams such that, while viewing the partial video stream, the user of said client machine can read said text as a reference text of said one of the partial video streams and select said link information to view another content connected by said link as reference information of said one of the partial video streams.

2. The stream processing system of claim 1, wherein said contents storage device stores a plurality of said composite contents that are created by said contents production device, and said contents server receives keywords from said client machine, selects one of said composite contents on the basis of said keywords, and transmits said one of said composite contents to said client machine.

3. The stream processing system of claim 1, wherein said contents production device is operable also to select an audio content and create said composite content with said selected audio content included therein.

4. The stream processing system of claim 1, wherein said contents production device is operable to partition one video content into a plurality of partial video streams in advance of creating said composite content by detecting scene change points in said one video content.

5. The stream processing system of claim 1, wherein said contents production device is operable to partition one video content into a plurality of partial video streams in advance of creating said composite content by detecting an input level variation amount of speech data in said one video content.

6. A stream processing system comprising:
a contents storage device operable to store a plurality of video contents;
a contents production device including a user interface to:
select a plurality of different video contents from among said plurality of video contents stored in said contents storage device,
partition each of said plurality of different video contents into a plurality of partial video streams,
select part of said plurality of partial video streams of each of said plurality of different video contents while selectively associating meta information items with the selected partial video streams, and
create a composite content by combining the selected partial video streams of said plurality of different video contents together with said meta information, wherein said composite content contains information of each selected partial video stream as a virtual video stream comprising a start time and an end time of the partial video stream in each different video content;
a contents server connected to said contents storage device, operable to provide said composite content by reading said composite content from said contents storage device and outputting said composite content in response to an external request, and operable to provide the partial video stream of each different video content in response to an external request; and
a client machine connected to said contents server and operable to receive said composite content from said contents server, parse said composite content, send a request for the partial video streams of said different video contents to said contents server based on the respective virtual video streams of said composite content as parsed, receive the partial video streams from said contents server, and sequentially and continuously play back the partial video streams,
wherein each of said meta information items contains a title, a text, keywords, and link information, said text describing a content of the partial video stream corresponding to said each of said meta information items, and
wherein said client machine is operable to display, when one of the partial video streams is displayed during playing back said real video stream, one of said meta information items corresponding to said one of the partial video streams such that, while viewing the partial video stream, the user of said client machine can read said text as a reference text of said one of the partial video streams and select said link information to view another content connected by said link as reference information of said one of the partial video streams.

7. The stream processing system of claim 6, wherein said contents storage device stores a plurality of said composite contents that are created by said contents production device, and said contents server receives keywords from said client machine, selects one of said composite contents based on said keywords, and transmits said one of said composite contents to said client machine.

8. The stream processing system of claim 6, wherein said contents production device is operable also to select an audio content and create said composite content with said selected audio content included therein.

9. The stream processing system of claim 6, wherein said contents production device is operable to partition one video content into a plurality of partial video streams in advance of creating said composite content by detecting scene change points in said one video content.

10. The stream processing system of claim 6, wherein said contents production device is operable to partition one video content into a plurality of partial video streams in advance of creating said composite content by detecting an input level variation amount of speech data in said one video content.

* * * * *